(12) United States Patent
Jen et al.

(10) Patent No.: US 8,329,137 B2
(45) Date of Patent: Dec. 11, 2012

(54) METHOD FOR MAKING A CHALCOPYRITE-TYPE COMPOUND

(75) Inventors: Chung-Chi Jen, Kaohsiung (TW);
Wen-Hao Yuan, Kaohsiung (TW);
Bang-Yen Chou, Kaohsiung (TW);
Yen-Liang Tu, Kaohsiung (TW);
Chiu-Kung Huang, Kaohsiung (TW);
Jun-Shing Chiou, Kaohsiung (TW);
Tzo-Ing Lin, Kaohsiung (TW)

(73) Assignee: Nanowin Technology Co., Ltd. (TW)

( * ) Notice: Subject to any disclaimer, the term of this patent is extended or adjusted under 35 U.S.C. 154(b) by 48 days.

(21) Appl. No.: 13/009,918

(22) Filed: Jan. 20, 2011

(65) Prior Publication Data

US 2012/0189533 A1    Jul. 26, 2012

(51) Int. Cl.
*C01B 19/00* (2006.01)
*C01B 19/04* (2006.01)
*C01B 17/00* (2006.01)

(52) U.S. Cl. ...... 423/508; 423/509; 423/511; 423/561.1

(58) Field of Classification Search ............... 423/508, 423/509, 511, 561.1
See application file for complete search history.

(56) References Cited

U.S. PATENT DOCUMENTS

| | | | |
|---|---|---|---|
| 7,267,810 B2 * | 9/2007 | Yu et al. | 423/508 |
| 7,566,435 B2 * | 7/2009 | Chen et al. | 423/566.1 |
| 7,829,059 B2 * | 11/2010 | Guo et al. | 423/508 |
| 7,914,762 B2 * | 3/2011 | Hwang et al. | 423/508 |
| 7,955,586 B2 * | 6/2011 | Jung et al. | 423/508 |
| 7,985,388 B2 * | 7/2011 | Shen et al. | 423/1 |

* cited by examiner

*Primary Examiner* — Timothy Vanoy
(74) *Attorney, Agent, or Firm* — Ostrolenk Faber LLP

(57) ABSTRACT

A method for making a chalcopyrite-type compound includes reacting a reaction mixture in a solvent under reflux condition to form the chalcopyrite-type compound. The reaction mixture includes at least one first compound and at least one second compound. The first compound contains $M^1$ and A. The second compound contains $M^2$ and A. $M^1$ is selected from Cu, Au, Ag, Na, Li and K, $M^2$ is selected from In, Ga, Al, Ti, Zn, Cd, Sn, Mg, and combinations thereof, and A is selected from S, Se, Te, and combinations thereof.

15 Claims, 16 Drawing Sheets

METHOD FOR MAKING A CHALCOPYRITE-TYPE COMPOUND

BACKGROUND OF THE INVENTION

1. Field of the Invention

This invention relates to a method for making a chalcopyrite-type compound.

2. Description of the Related Art

Chalcopyrite-type compounds, such as $CuInSe_2$, $Cu(In_xGa_{1-x})(Se_yS_{2-y})$, and $Cu(In_xAl_{1-x})(Se_yS_{2-y})$ are used in the production of a semiconductor absorption layer of a solar cell due to their high optoelectric efficiency and low cost. The amount of impurities, such as the carbon content, contained in the chalcopyrite-type compound has a significantly adverse effect on the optoelectric efficiency thereof. It is desirable to manufacture a chalcopyrite-type compound having a low impurity content.

Bin Li et al. (*Adv. Mater.*, 1999, 11, No. 17, 1456-1459) disclose a solvothermal synthesis method for making $CuInSe_2$ nano-materials. The method involves reacting a mixture of $CuCl_2.2H_2O$, $InCl_3.4H_2O$ and Se powder in a solvent of ethylenediamine at a temperature of 180° C. for 15 hr to form a precipitate. The precipitate thus formed is rinsed with an aqueous solution containing water and ethanol so as to remove by-product from the precipitate, followed by drying so as to form the chalcopyrite-type compound powder having a structure of a chalcopyrite phase. The chalcopyrite-type compound thus formed has a high carbon impurity content.

U.S. Pat. No. 7,591,990 discloses a process for making a chalcopyrite-type compound of formula $M^3M^1A_2$, where $M^1$ can be selected from $Al^{3+}$, $Ga^{3+}$, $In^{3+}$, etc., $M^3$ can be selected from $Cu^+$, $Ag^+$, etc., and A can be selected from S, Se, and Te. The process comprises reacting a compound of formula $M^3X$ with a compound of formula $M^2M^1A_2$ in a coordinating solvent so as to form the chalcopyrite-type compound of formula $M^3M^1A_2$, where X can be halogen atom and $M^2$ can be $Li^+$, $Na^+$, $K^+$, etc. The aforesaid process requires preparation of a ternary compound $M^2M^1A_2$ as the starting material, which is more complicated as compared to a binary compound. Moreover, the reaction product of the chalcopyrite-type compound thus formed also has a relatively high impurity content. Experiments show that the chalcopyrite-type compound thus formed has a carbon impurity content of about 4.3 wt %.

The whole disclosure of U.S. Pat. No. 7,591,990 is incorporated herein by reference.

SUMMARY OF THE INVENTION

Therefore, an object of the present invention is to provide a method for making a chalcopyrite-type compound that can overcome the aforesaid drawbacks associated with the prior art.

According to the present invention, a method for making a chalcopyrite-type compound comprises reacting a reaction mixture in a solvent under reflux condition to form the chalcopyrite-type compound. The reaction mixture includes at least one first compound and at least one second compound. The first compound contains $M^1$ and A. The second compound contains $M^2$ and A. $M^1$ is selected from Cu, Au, Ag, Na, Li and K, $M^2$ is selected from In, Ga, Al, Ti, Zn, Cd, Sn, Mg, and combinations thereof, and A is selected from S, Se, Te, and combinations thereof.

BRIEF DESCRIPTION OF THE DRAWINGS

Other features and advantages of the present invention will become apparent in the following detailed description of the preferred embodiment of this invention, with reference to the accompanying drawings, in which.

DETAILED DESCRIPTION OF THE PREFERRED EMBODIMENT

Figure 1:
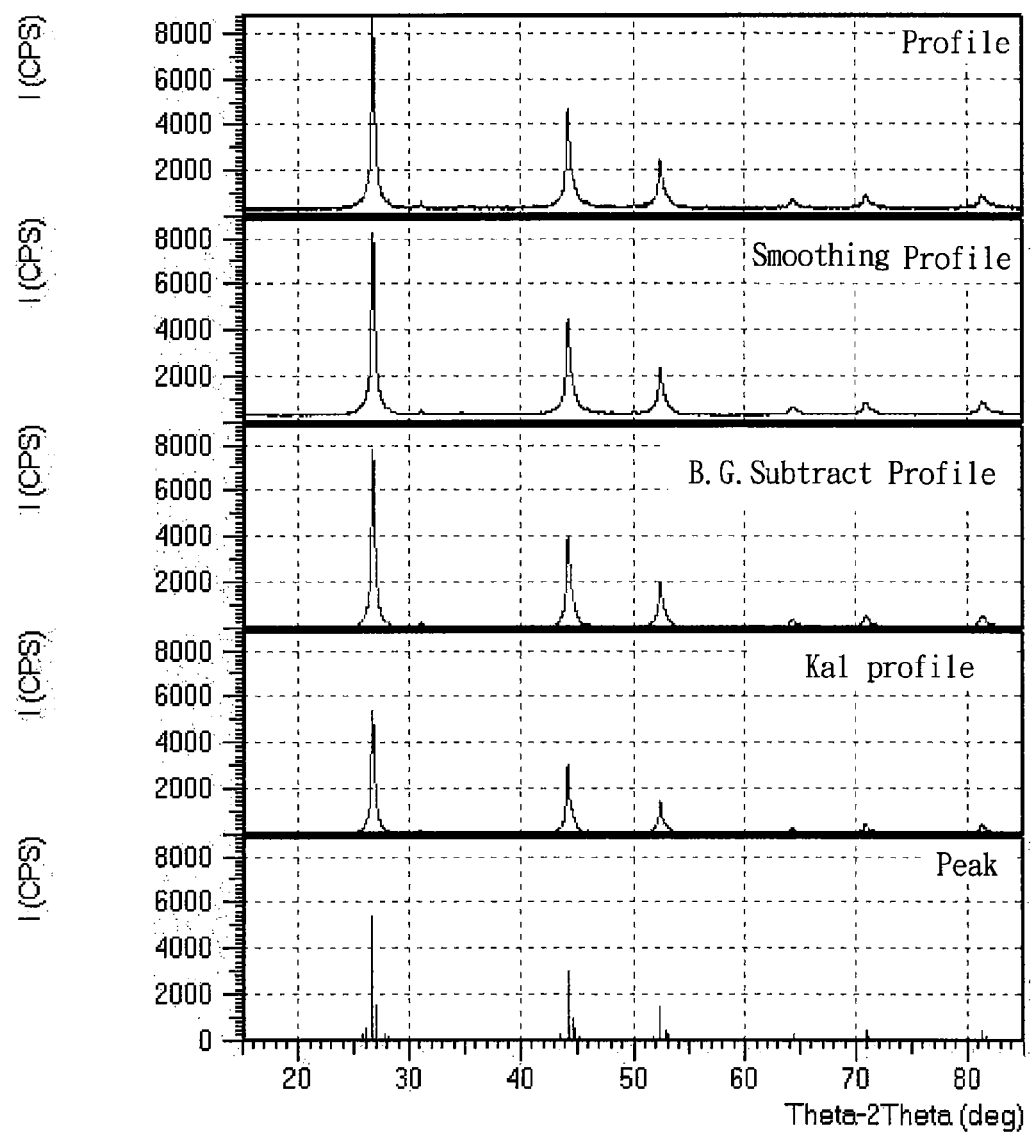
FIG. 1 shows an X-ray diffraction pattern of the product (c) of Example 1 made by the method of the preferred embodiment of this invention.

The preferred embodiment of a method for making a chalcopyrite-type compound according to this invention includes reacting a reaction mixture in a solvent under reflux condition to form the chalcopyrite-type compound. The reaction mixture includes at least one first compound and at least one second compound. The first compound is any compound containing $M^1$ and A. The second compound is any compound containing $M^2$ and A. $M^1$ is selected from Cu, Au, Ag, Na, Li and K, $M^2$ is selected from In, Ga, Al, Ti, Zn, Cd, Sn, Mg, and combinations thereof, and A is selected from S, Se, Te, and combinations thereof.

Suitable examples of the solvent are alkylamines, dimethyl foramide (DMF), N-methylpyrolidone (NMP), dimethyl sulfoxide (DMSO), oleylamine, glycerol, and ethyleneglycol. Preferably, the solvent is alkylamines, and more preferably, the solvent is ethylenediamine.

The preferred embodiment further comprises filtering the reaction mixture after the reaction of the first and second compounds is completed so as to obtain a crude cake of the chalcopyrite-type compound, followed by washing the crude cake with a washing solution containing water, alcohol and ketone, and drying the crude cake.

Preferably, the preferred embodiment further comprises a post-treatment step that is conducted by mixing the crude cake of the chalcopyrite-type compound with a solvent and a powder of a post-treatment material selected from S, Se, Te, and combinations thereof after washing with the washing solution so as to form a mixture, and heating the mixture in a manner to permit the mixture to undergo a post treatment under reflux condition for removing impurities from the crude cake. Examples of the solvent used in the post-treatment step are the same as those used in the reaction step of the reaction mixture.

Preferably, the preferred embodiment of this invention further comprises washing the crude cake of chalcopyrite-type compound with an acid solution, followed by a second washing with the washing solution.

Preferably, the second compound is prepared by reacting a chemical substance comprising $M^2$ and X, in which X represents an anion selected from halide, nitrate($NO_3^-$), and sulfate($SO_4^{2-}$), with a powder of a material selected from S, Se, Te, and combinations thereof in a solvent solution under reflux condition, filtering the reaction mixture after the reaction is completed so as to obtain a crude cake of the second compound, washing the crude cake of the second compound with a washing solution containing water, alcohol and ketone, and drying the crude cake. Preferably, the solvent solution is a solvent or a mixture of water and a solvent. Examples of the solvent used herein are the same as those mentioned in the reaction step of the reaction mixture.

Preferably, the preferred embodiment of this invention further comprises washing the crude cake of the second compound with an acid solution after the first washing of the crude cake with the washing solution, followed by a second washing with the washing solution and drying the crude cake.

Preferably, the first compound is prepared by reacting a chemical substance $M^1X$, in which X represents an anion selected from halide, $NO_3^-$, and $SO_4^{2-}$, with the powder of a material selected from S, Se, Te, and combinations thereof in a solvent solution under reflux condition, followed by filtering the reaction mixture after the reaction is completed so as to obtain a crude cake of the first compound, washing the crude cake of the first compound with the washing solution containing water, alcohol and ketone, and drying the crude cake. Preferably, the solvent solution is a solvent or a mixture of water and a solvent. Examples of the solvent used herein are the same as those mentioned in the reaction step of the reaction mixture.

Suitable examples of the acid in the acid solution include nitric acid, hydrochloric acid, citric acid, acetic acid, phosphoric acid, sulfuric acid, and oxalic acid. Preferably, when a strong acid is used, the concentration of the strong acid ranges from 5-10 wt %.

As compared to the method disclosed in U.S. Pat. No. 7,591,990, all the reactants, i.e., the first and second compounds, employed in the method of this invention contain at least one of S, Se, and Te, while only one of the reactants employed in the method of U.S. Pat. No. 7,591,990 is a selenide. This difference permits the method of this invention to make chalcopyrite-type compound with a lower carbon content than that of U.S. Pat. No. 7,591,990.

The merits of the method for making the chalcopyrite-type compound of this invention will become apparent with reference to the following Examples and Comparative Examples. The method of this invention should not be restricted to the following Examples.

Example 1 (E1)

Preparation of $In_2Se_3$ ($M^2A$)

4000 ml of ethylenediamine was added into a reactor. 302.5 g of Se powder was added into the reactor with stirring. The mixture in the reactor was stirred for 5 minutes. 750.5 g of $InCl_3 \cdot 4H_2O$ was slowly added into the reactor with stirring. The mixture in the reactor was stirred for 20 minutes before heating and was heated to a boiling point thereof with stirring for reaction of the mixture to take place. The reaction of the mixture lasted under reflux condition for 30 hrs. The mixture was filtered to obtain a crude cake of $In_2Se_3$ after the reaction was completed and the mixture was cooled. The crude cake was washed with a solution containing a large amount of water, 4 L of ethanol and 4 L of acetone, followed by drying at a temperature of 150° C. A yellow powder (product (a)) of $In_2Se_3$ having a composition of 42.63 at % In and 57.37 at % Se was obtained. Elemental analysis shows that the yellow powder contains an impurity of 4.81 wt % of carbon.

Preparation of $Cu_2Se$ ($M^1A$)

5500 ml of ethylenediamine was added into a reactor. 231 g of Se powder was added into the reactor with stirring. The mixture in the reactor was stirred for 5 minutes. 580 g of CuCl was slowly added into the reactor with stirring. The mixture in the reactor was stirred for 5 minutes before heating and was heated to a boiling point thereof with stirring for reaction of the mixture to take place. The reaction of the mixture lasted under reflux condition for 24 hrs. The mixture was filtered to obtain a crude cake of $Cu_2Se$ after the reaction was completed and the mixture was cooled. The crude cake was washed with a solution containing a large amount of water, 2 L of ethanol and 2 L of acetone, followed by drying at a temperature of 150° C. A dark blue powder (product (b)) of $Cu_2Se$ having a composition of 63.82 at % Cu and 36.18 at % Se was obtained. Elemental analysis shows that the dark blue powder contains an impurity of 0.1 wt % of carbon.

Preparation of Ternary Compound $CuInSe_2$ ($M^1M^2A$)

900 ml of ethylenediamine was added into a reactor. 600 g of product (a) and 260 g of product (b) were added into the reactor with stirring. The mixture in the reactor was stirred for 5 minutes before heating and was subsequently heated to a boiling point thereof with stirring for reaction of the mixture to take place. The reaction of the mixture lasted under reflux condition for 30 hrs. The mixture was filtered to obtain a crude cake of $CuInSe_2$ after the reaction was completed and the mixture was cooled. The crude cake was washed with a solution containing a large amount of water, 2 L of ethanol and 2 L of acetone, followed by drying at a temperature of 150° C. A black powder (product (c)) of $CuInSe_2$ having a composition of 25.43 at % Cu, 26.68 at % In and 47.89 at % Se was obtained. Elemental analysis shows that the black powder contains an impurity of 1.536 wt % of carbon. FIG. 1 shows the X-ray diffraction (XRD) pattern of the black powder (product (c)).

Example 2 (E2)

Removal of Impurity from Product (c)

Figure 2:
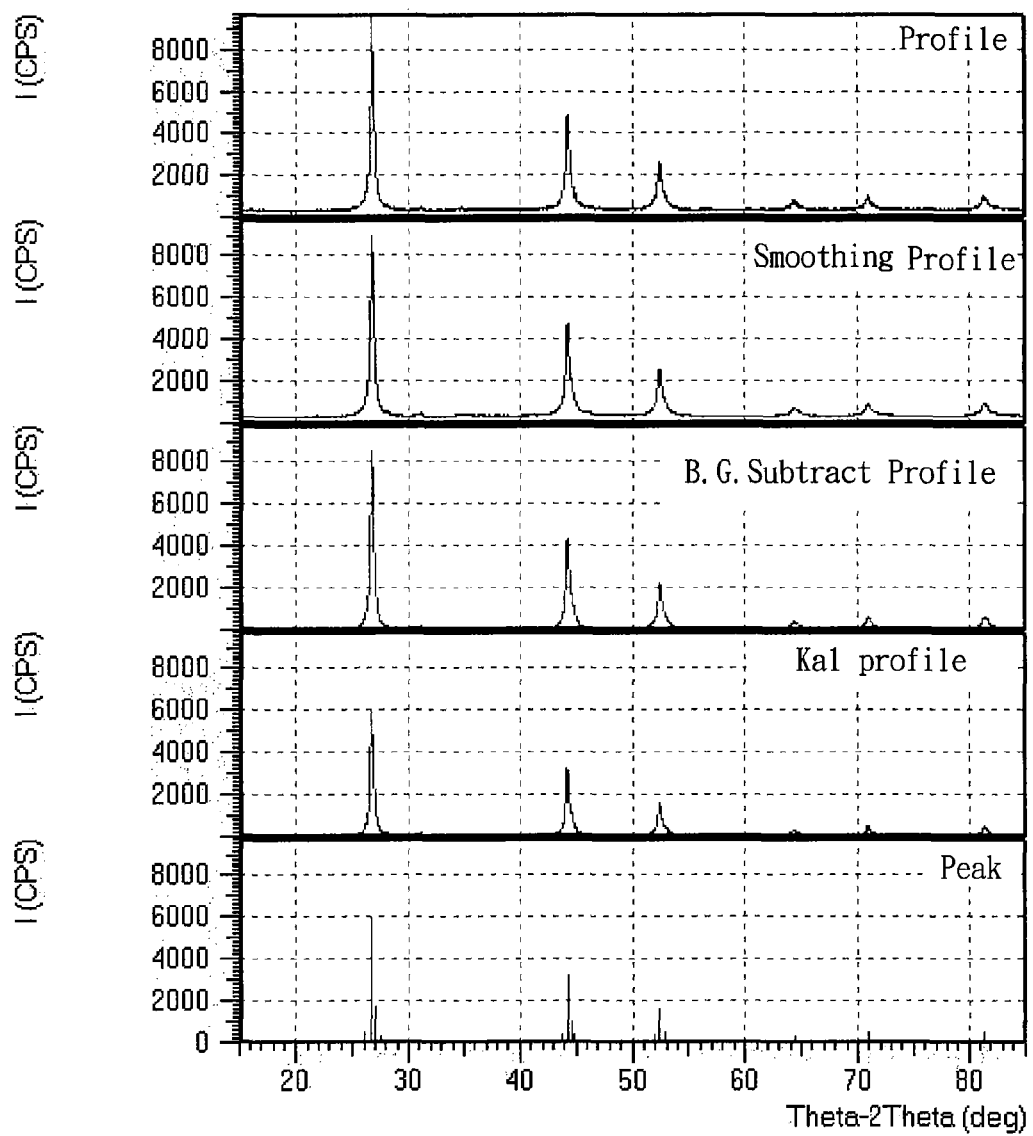
FIG. 2 shows an X-ray diffraction pattern of the product (d) of Example 2 made by the method of the preferred embodiment.

6000 ml of ethylenediamine was added into a reactor. 730 g of product (c) and 20 g of Se powder were added into the reactor with stirring. The mixture in the reactor was stirred for 5 minutes before heating and was subsequently heated to its boiling point with stirring for 40 hrs for conducting a post treatment of the product (c) of the mixture under reflux condition. The mixture was filtered to obtain a crude cake of $CuInSe_2$ after the post treatment was completed and the mixture was cooled. The crude cake was washed with a solution containing a large amount of water, 2 L of ethanol and 2 L of acetone, followed by drying at a temperature of 150° C. A black powder (product (d)) of $CuInSe_2$ having a composition of 25.44 at % Cu, 26.67 at % In, and 47.88 at % Se was obtained. Elemental analysis shows that the black powder contains an impurity of 0.877 wt % of carbon. FIG. 2 shows the X-ray diffraction (XRD) pattern of the black powder (product (d)).

The post treatment in Example 2 permits a significant reduction of the carbon content of the $CuInSe_2$ product from 1.536 wt % (product (c)) to 0.877 wt % (product (d)).

Example 3 (E3)

Removal of Impurity from Product (d)

Figure 3:
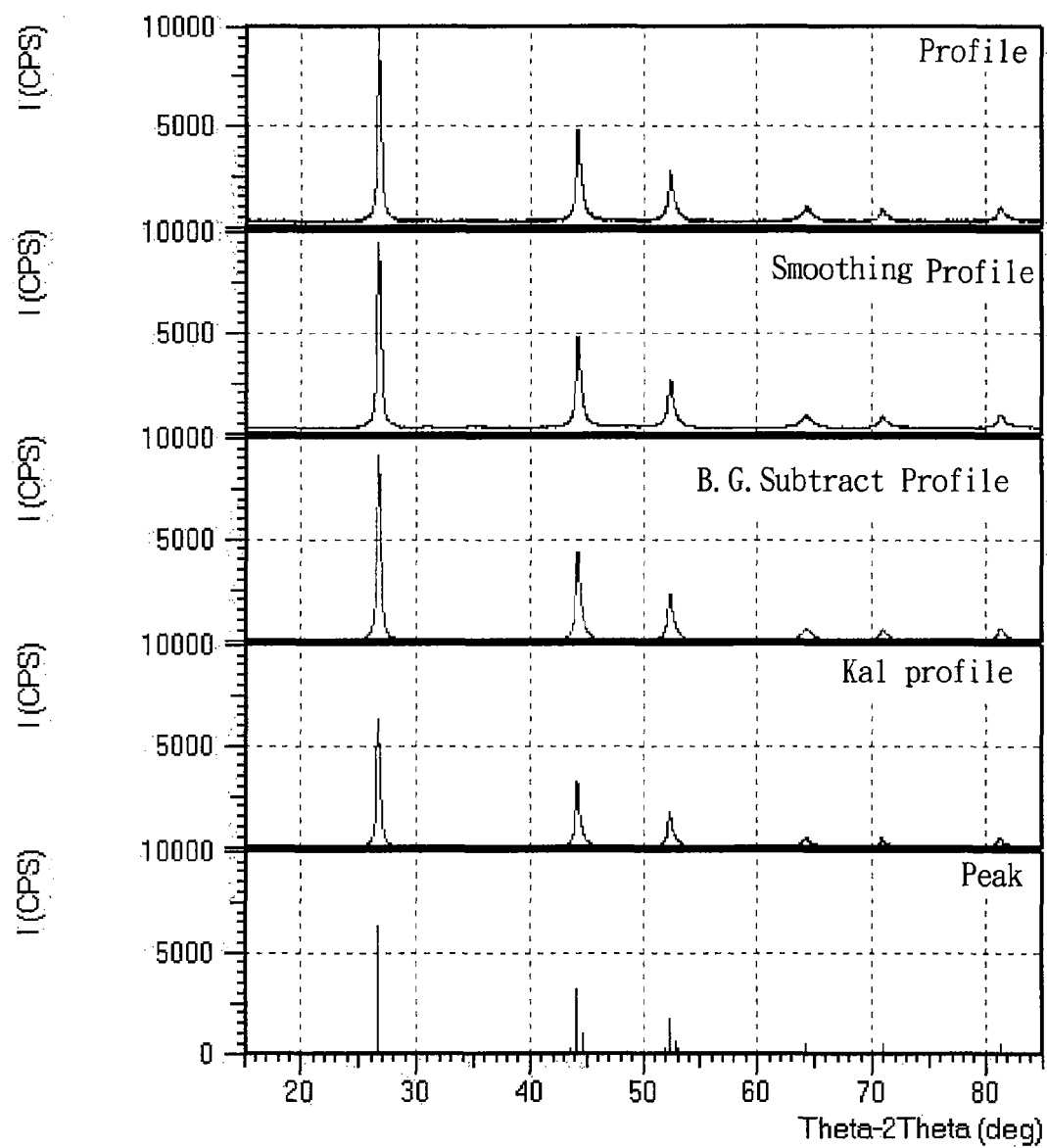
FIG. 3 shows an X-ray diffraction pattern of the product (e) of Example 3 made by the method of the preferred embodiment.

5400 ml of 5% nitric acid solution was added into a reactor. 650 g of product (d) was added into the reactor with stirring. The mixture was subsequently heated to 45° C. with stirring for 4 hrs. The mixture was filtered to obtain a crude cake of $CuInSe_2$ after the treatment was completed and the mixture was cooled. The crude cake was washed with a solution containing a large amount of water, 2 L of ethanol and 2 L of acetone, followed by drying at a temperature of 150° C. A black powder (product (e)) of $CuInSe_2$ having a composition of 26.29 at % Cu, 25.45 at % In, and 48.26 at % Se was obtained. Elemental analysis shows that the black powder contains an impurity of 0.713 wt % of carbon. FIG. 3 shows the X-ray diffraction (XRD) pattern of the black powder (product (e)).

Example 4 (E4)

Acid Washing Treatment of Product (a)

6500 ml of 5% nitric acid solution was added into a reactor. 780 g of product (a) was added into the reactor with stirring. The mixture was subsequently heated to 45° C. with stirring for 4 hrs. The mixture was filtered to obtain a crude cake of $In_2Se_3$ after the treatment was completed and the mixture was cooled. The crude cake was washed with a solution containing a large amount of water, 2 L of ethanol and 2 L of acetone, followed by drying at a temperature of 150° C. A dark brown powder (product (f)) of $In_2Se_3$ having a composition of 42.32 at % In and 57.68 at % Se was obtained. Elemental analysis shows that the dark brown powder contains an impurity of 0.692 wt % of carbon.

Preparation of Ternary Compound $CuInSe_2$ ($M^1M^2A$)

Figure 4:
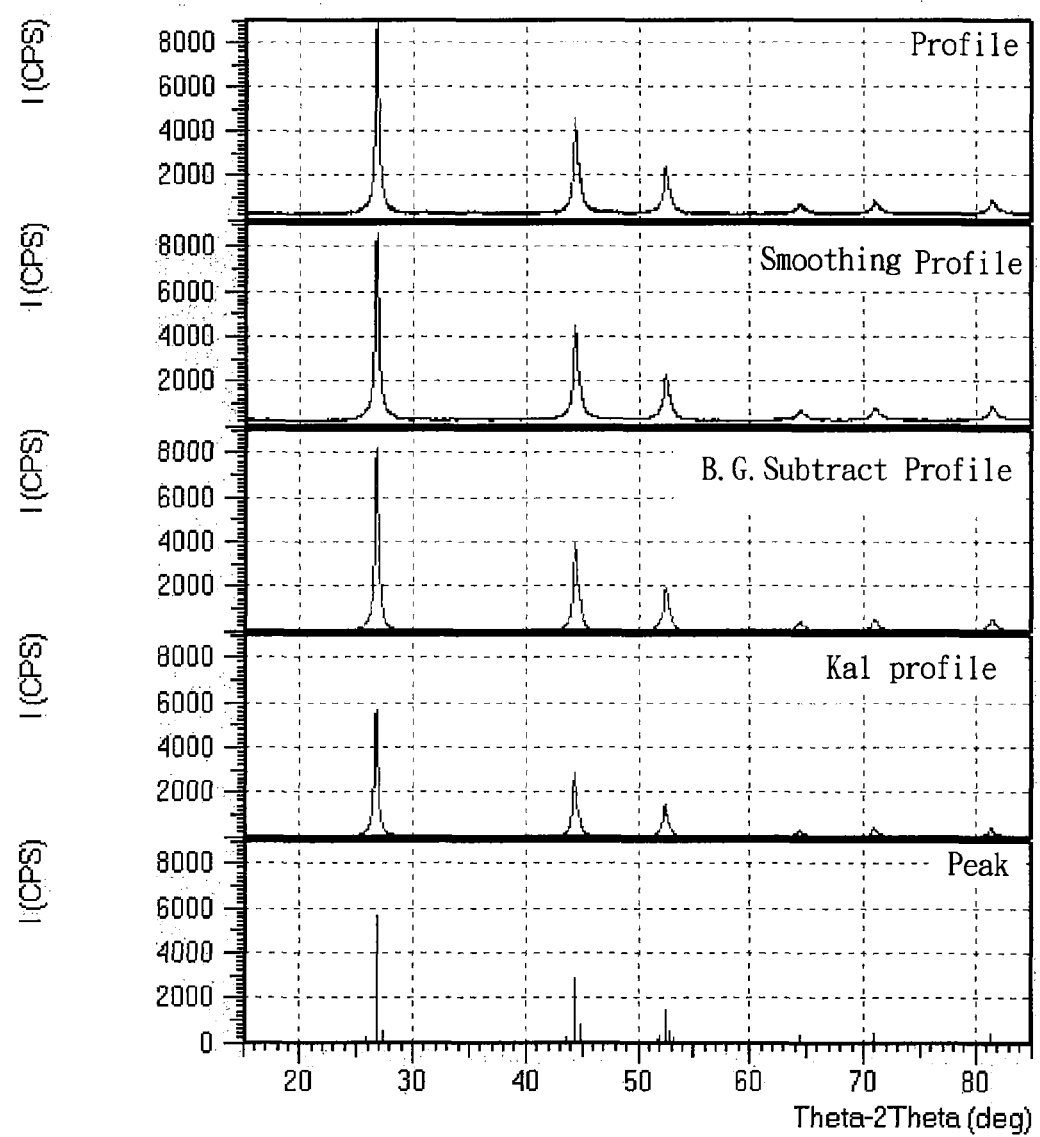
FIG. 4 shows an X-ray diffraction pattern of the product (g) of Example 4 made by the method of the preferred embodiment.

7500 ml of ethylenediamine was added into a reactor. 600 g of product (f) and 278.2 g of product (b) were added into the reactor with stirring. The mixture in the reactor was stirred for 5 minutes before heating and was subsequently heated to a boiling point thereof with stirring for reaction of the mixture to take place. The reaction of the mixture lasted under reflux condition for 30 hrs. The mixture was filtered to obtain a crude cake of $CuInSe_2$ after the reaction was completed and the mixture was cooled. The crude cake was washed with a solution containing a large amount of water, 2 L of ethanol and 2 L of acetone, followed by drying at a temperature of 150° C. A black powder (product (g)) of $CuInSe_2$ having a composition of 24.78 at % Cu, 24.47 at % In and 47.75 at % Se was obtained. Elemental analysis shows that the black powder contains an impurity of 0.612 wt % of carbon. FIG. 4 shows the X-ray diffraction (XRD) pattern of the black powder (product (g)).

Example 4 differs from Example 1 in that the product (a) ($In_2Se_3$ product) of Example 4 is further treated with an acid solution before mixing and reacting with the product (b). The results show that the carbon content of the $In_2Se_3$ product is considerably reduced from 4.81 wt % (product (a)) to 0.692 wt % (product (f)) and that the carbon content of the $CuInSe_2$ product is reduced from 1.536 wt % (product (c)) to 0.612 wt % (product (g)).

Example 5 (E5)

Preparation of InSe ($M^2A$)

1400 ml of water was added into a reactor. 470.4 g of $InCl_3.4H_2O$ was added and dissolved in the water in the reactor with stirring. 7000 ml of ethylenediamine was slowly added into the reactor with stirring (since exothermic heat was produced during mixing, the addition rate of ethylenediamine was controlled in a manner that the mixture was maintained at a temperature less than 70° C.). 188.2 g of Se powder was added into the reactor with stirring and in a manner that the mixture was maintained at a temperature not greater than 40° C. The mixture in the reactor was stirred for 5 minutes. The mixture in the reactor was stirred for 5 minutes before heating and was heated to a boiling point thereof with stirring for reaction of the mixture to take place. The reaction of the mixture lasted under reflux condition for 30 hrs. The mixture was filtered to obtain a crude cake of InSe after the reaction was completed and the mixture was cooled. The crude cake was washed with a solution containing a large amount of water, 2 L (Liter) of ethanol and 2 L of acetone, followed by drying at a temperature of 150° C. A yellow brownish powder (product (h)) of InSe having a composition of 47.48 at % In, and 52.52 at % Se was obtained. Elemental analysis shows that the yellow brownish powder contains an impurity of 3.432 wt % of carbon.

Preparation of Ternary Compound $CuInSe_2$ ($M^1M^2A$)

Figure 5:
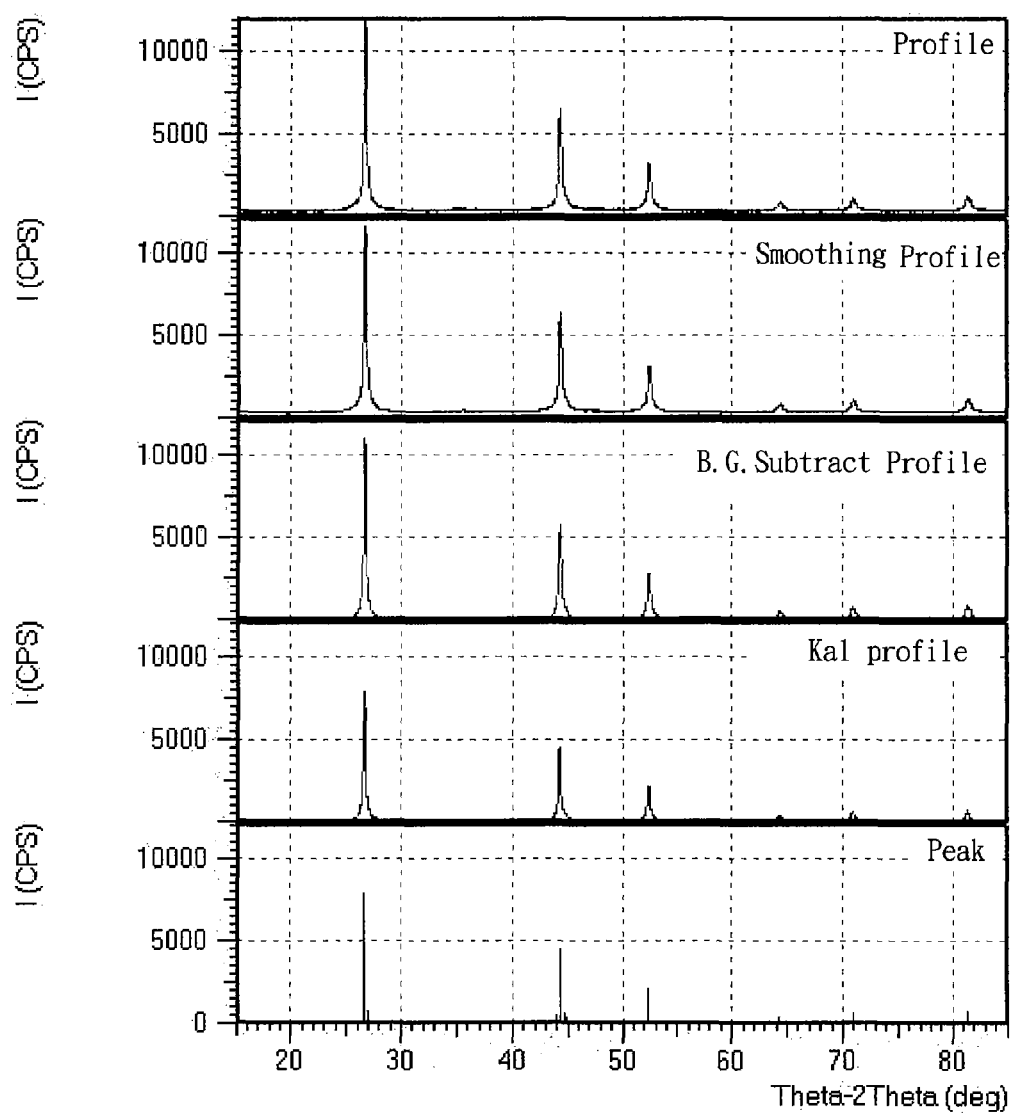
FIG. 5 shows an X-ray diffraction pattern of the product (i) of Example 5 made by the method of the preferred embodiment.

9000 ml of ethylenediamine was added into a reactor. 600 g of product (h) and 280 g of product (b) were added into the reactor with stirring. The mixture in the reactor was stirred for 5 minutes before heating and was subsequently heated to a boiling point thereof with stirring for reaction of the mixture to take place. The reaction of the mixture lasted under reflux condition for 40 hrs. The mixture was filtered to obtain a crude cake of $CuInSe_2$ after the reaction was completed and the mixture was cooled. The crude cake was washed with a solution containing a large amount of water, 2 L of ethanol and 2 L of acetone, followed by drying at a temperature of 150° C. A black powder (product (i)) of $CuInSe_2$ having a composition of 26.86 at % Cu, 26.79 at % In, and 46.35 at % Se was obtained. Elemental analysis shows that the black powder contains an impurity of 1.013 wt % of carbon. FIG. 5 shows the X-ray diffraction (XRD) pattern of the black powder (product (i)).

Example 5 differs from Example 1 in that reaction of $InCl_3.4H_2O$ with Se powder is formed into InSe and is carried out in the presence of a mixture of water and ethylenediamine for Example 5, and is formed into $In_2Se_3$ and is carried out in the presence of solely ethylenediamine for Example 1. The results show that the carbon content of the InSe product is reduced from 4.821 wt % (product (a)) to 3.432 wt % (product (h)) and that the carbon content of the $CuInSe_2$ product is reduced from 1.536 wt % (product (c)) to 1.013 wt % (product (i)).

Example 6 (E6)

Removal of Impurity from Product (i)

Figure 6:
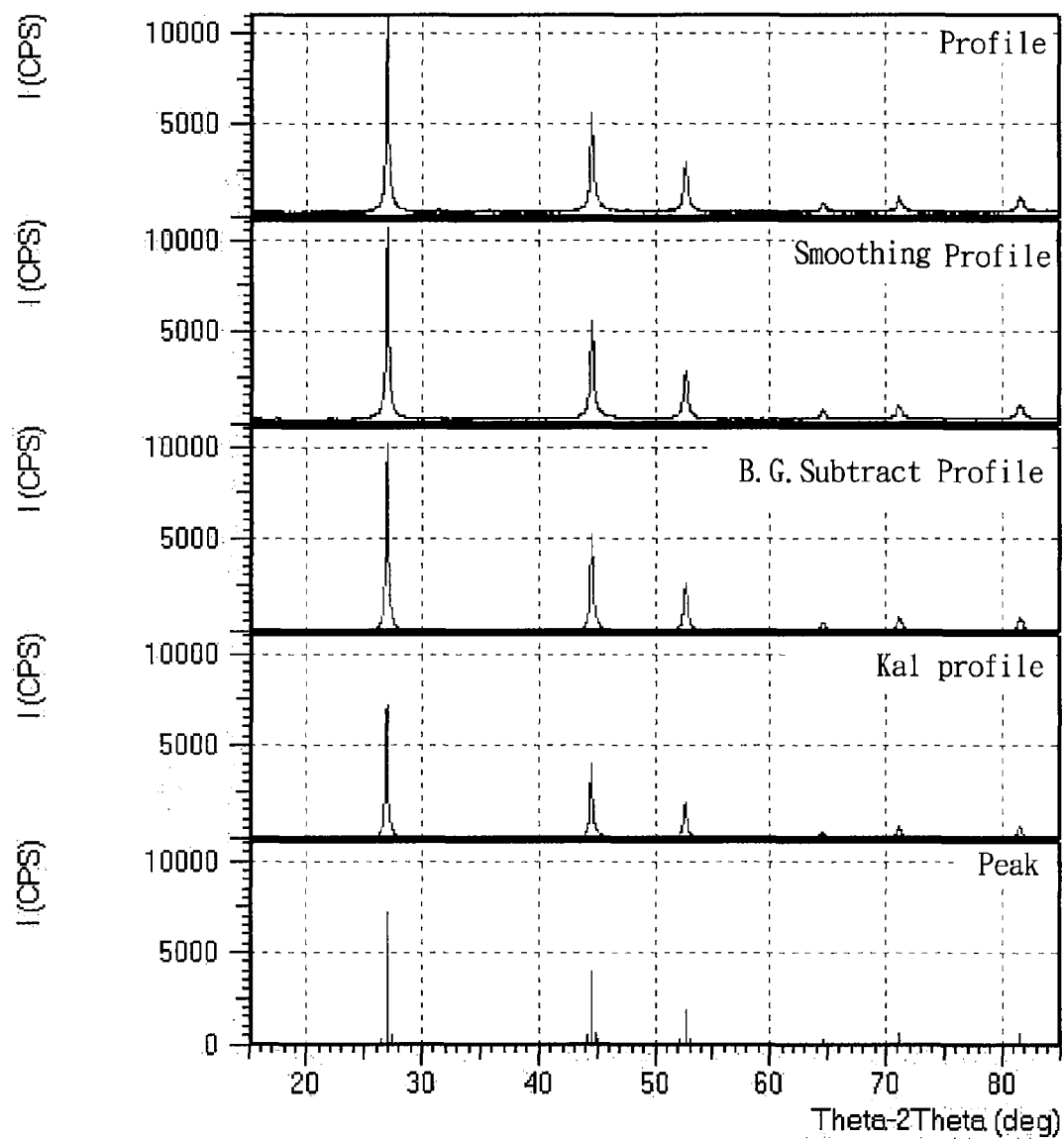
FIG. 6 shows an X-ray diffraction pattern of the product (j) of Example 6 made by the method of the preferred embodiment.

6000 ml of ethylenediamine was added into a reactor. 730 g of product (i) and 20 g of Se powder were added into the reactor with stirring. The mixture in the reactor was stirred for 5 minutes before heating and was subsequently heated to its boiling point with stirring for 40 hrs for conducting a post treatment of the product (i) of the mixture under reflux condition. The mixture was filtered to obtain a crude cake of $CuInSe_2$ after the post treatment was completed and the mixture was cooled. The crude cake was washed with a solution containing a large amount of water, 2 L of ethanol and 2 L of acetone, followed by drying at a temperature of 150° C. A black powder (product (j)) of $CuInSe_2$ having a composition of 26.16 at % Cu, 26.58 at % In, and 47.26 at % Se was obtained. Elemental analysis shows that the black powder contains an impurity of 0.579 wt % of carbon. FIG. 6 shows the X-ray diffraction (XRD) pattern of the black powder (product (j)).

Example 7 (E7)

Preparation of Quaternary Compound $CuInGaSe_2$ ($M^1M^2M^3A$)

Figure 7:
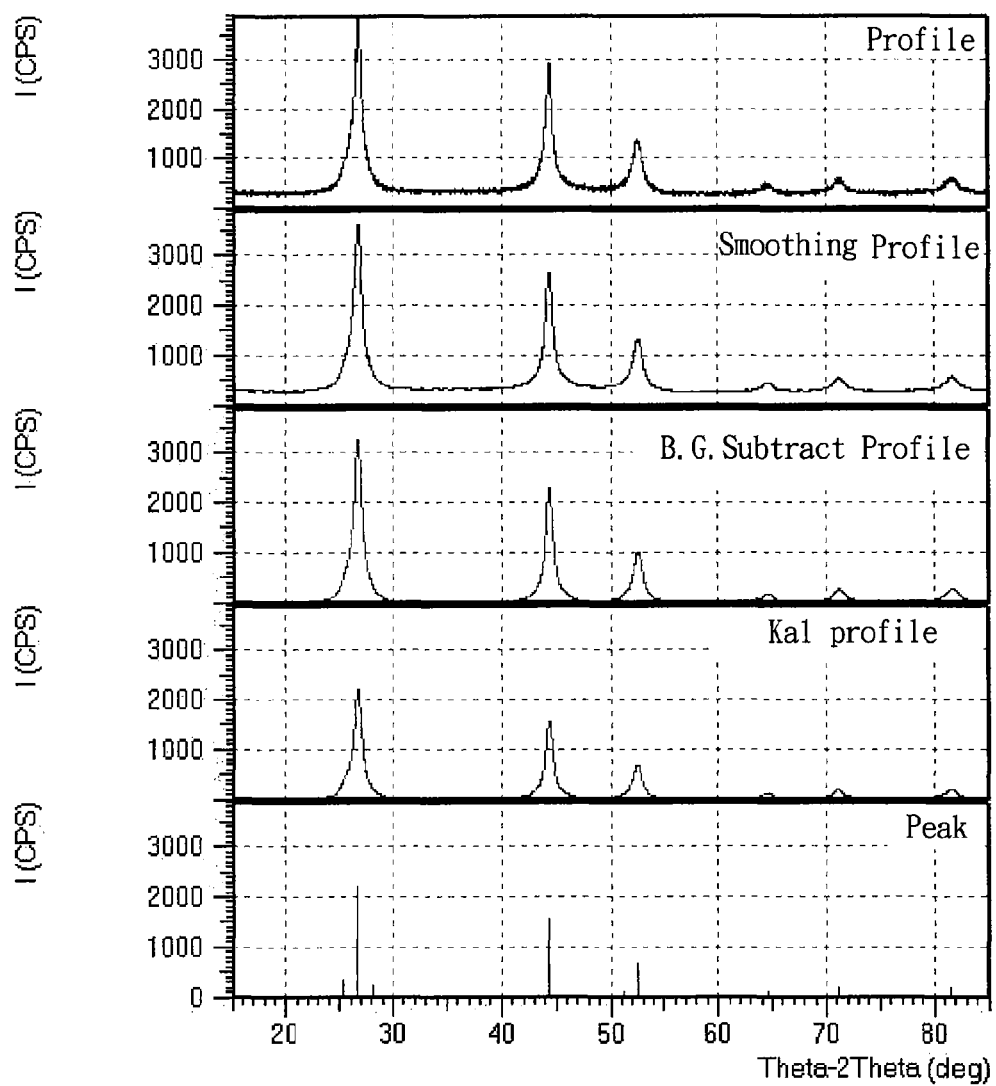
FIG. 7 shows an X-ray diffraction pattern of the product (k) of Example 7 made by the method of the preferred embodiment.

350 ml of ethylenediamine was added into a reactor. 6 g of product (a), 11.95 g of product (b) and 1.31 g $Ga_2Se_3$ were added into the reactor with stirring. The mixture in the reactor was stirred for 5 minutes before heating and was subsequently heated to a boiling point thereof with stirring for reaction of the mixture to take place. The reaction of the mixture lasted under reflux condition for 50 hrs. The mixture was filtered to obtain a crude cake of $CuInGaSe_2$ after the reaction was completed and the mixture was cooled. The crude cake was washed with a solution containing a large amount of water, 2 L of ethanol and 2 L of acetone, followed by drying at a temperature of 150° C. A black powder (product (k)) of $CuInGaSe_2$ having a composition of 24.4 at % Cu, 21.6 at % In, 6.48 at % Ga, and 47.52 at % Se was obtained. Elemental analysis shows that the black powder contains an impurity of 1.332 wt % of carbon. FIG. 7 shows the X-ray diffraction (XRD) pattern of the black powder (product (k)).

Example 8 (E8)

Removal of Impurity from Product (k)

Figure 8:
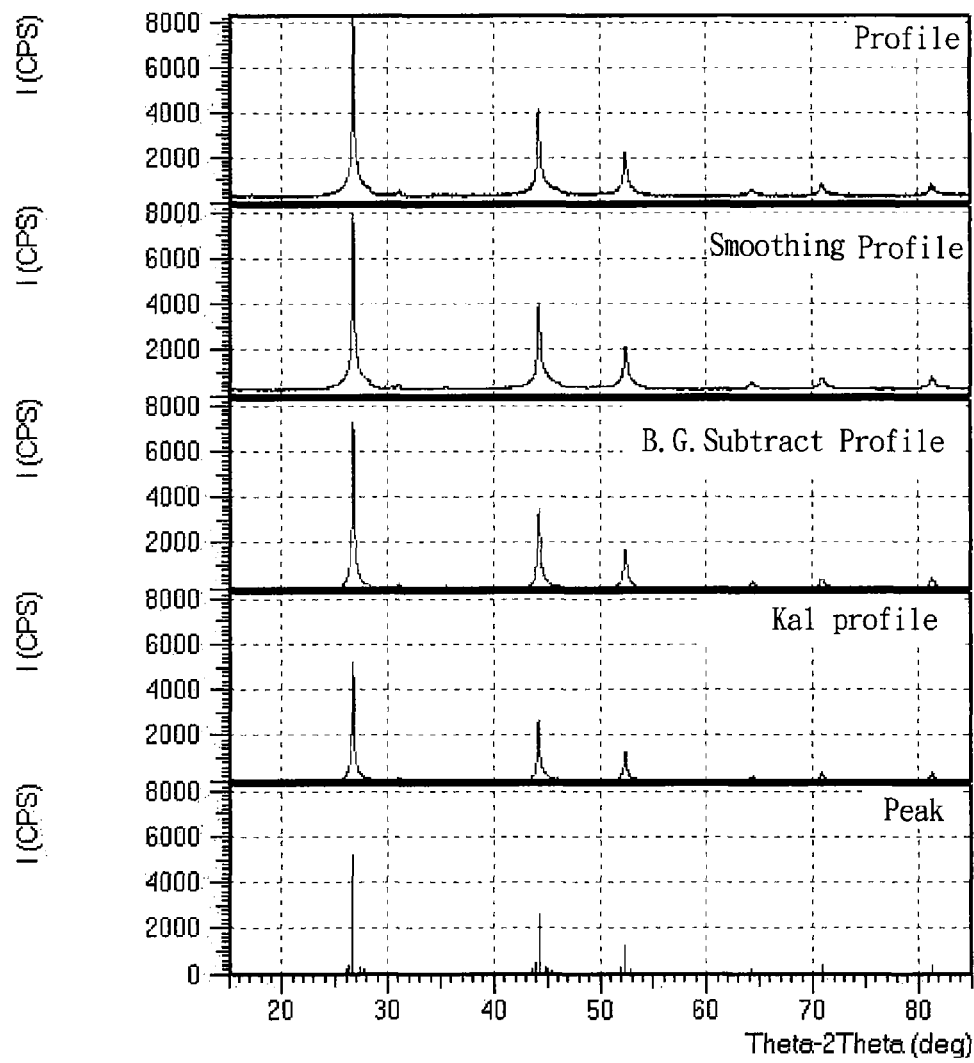
FIG. 8 shows an X-ray diffraction pattern of the product (l) of Example 8 made by the method of the preferred embodiment.

120 ml of ethylenediamine was added into a reactor. 15 g of product (k) and 0.9 g of Se powder were added into the reactor with stirring. The mixture in the reactor was stirred for 5 minutes before heating and was subsequently heated to its boiling point with stirring for 40 hrs for conducting a post treatment of the product (k) of the mixture under reflux condition. The mixture was filtered to obtain a crude cake of $CuInGaSe_2$ after the post treatment was completed and the mixture was cooled. The crude cake was washed with a solution containing a large amount of water, 2 L of ethanol and 2 L of acetone, followed by drying at a temperature of 150° C. A black powder (product (l)) of $CuInGaSe_2$ having a composition of 23.5 at % Cu, 22.28 at % In, 6.49 at % Ga, and 47.73 at % Se was obtained. Elemental analysis shows that the black powder contains an impurity of 0.65 wt % of carbon. FIG. 8 shows the X-ray diffraction (XRD) pattern of the black powder (product (l)).

Example 9 (E9)

Removal of Impurity from Product (l)

Figure 9:
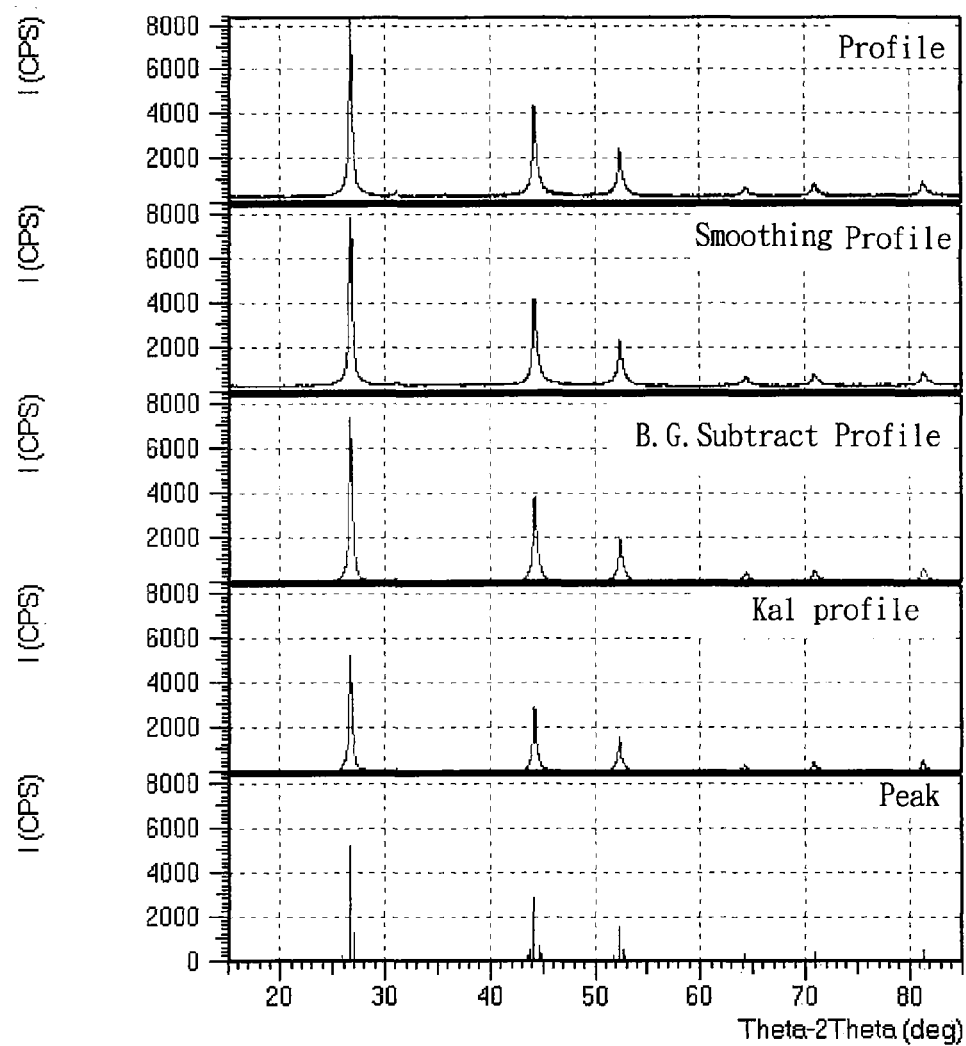
FIG. 9 shows an X-ray diffraction pattern of the product (m) of Example 9 made by the method of the preferred embodiment.

85 ml of 5% nitric acid solution was added into a reactor. 10 g of product (l) was added into the reactor with stirring. The mixture was subsequently heated to 45° C. with stirring for 4 hrs. The mixture was filtered to obtain a crude cake of $CuInGaSe_2$ after the treatment was completed and the mixture was cooled. The crude cake was washed with a solution containing a large amount of water, 2 L of ethanol and 2 L of acetone, followed by drying at a temperature of 150° C. A black powder (product (m)) of $CuInGaSe_2$ having a composition of 23.9 at % Cu, 22.23 at % In, 6.55 at % Ga, and 47.32 at % Se was obtained. Elemental analysis shows that the black powder contains an impurity of 0.511 wt % of carbon. FIG. 9 shows the X-ray diffraction (XRD) pattern of the black powder (product (m)).

Example 10 (E10)

Preparation of Five-Element Compound CuInGaSeS ($M^1M^2M^3A^1A^2$)

Figure 10:
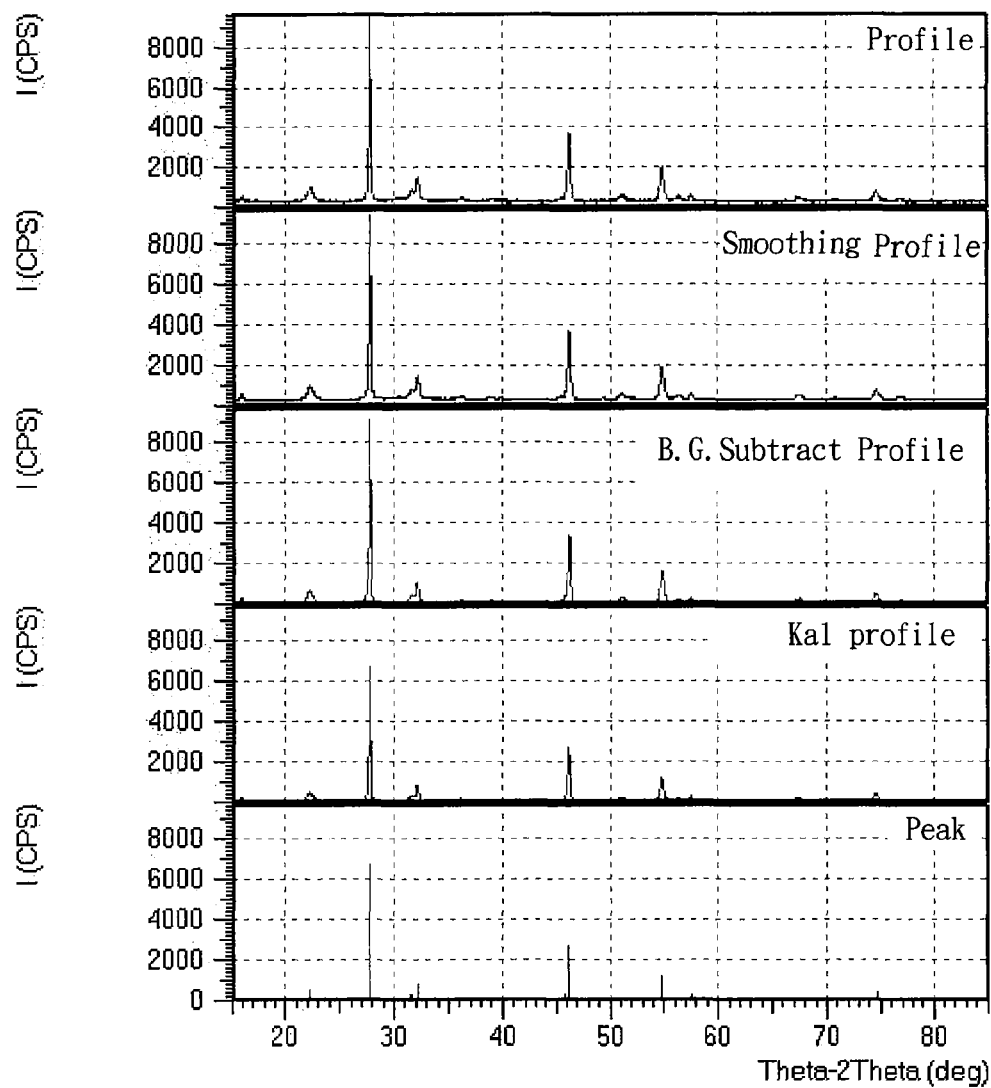
FIG. 10 shows an X-ray diffraction pattern of the product (n) of Example 10 made by the method of the preferred embodiment.

350 ml of ethylenediamine was added into a reactor. 6 g of product (b), 8.35 g of $In_2S_3$, and 1.31 g $Ga_2Se_3$ were added into the reactor with stirring. The mixture in the reactor was stirred for 5 minutes before heating and was subsequently heated to a boiling point thereof with stirring for reaction of the mixture to take place. The reaction of the mixture lasted under reflux condition for 50 hrs. The mixture was filtered to obtain a crude cake of CuInGaSeS after the reaction was completed and the mixture was cooled. The crude cake was washed with a solution containing a large amount of water, 2 L of ethanol and 2 L of acetone, followed by drying at a temperature of 150° C. A black powder (product (n)) of CuInGaSeS having a composition of 25.4 at % Cu, 19.68 at % In, 6.82 at % Ga, 18.1 at % Se, and 30 at % S was obtained. Elemental analysis shows that the black powder contains an impurity of 0.928 wt % of carbon. FIG. 10 shows the X-ray diffraction (XRD) pattern of the black powder (product (n)).

Example 11 (E11)

Removal of Impurity from Product (n)

Figure 11:
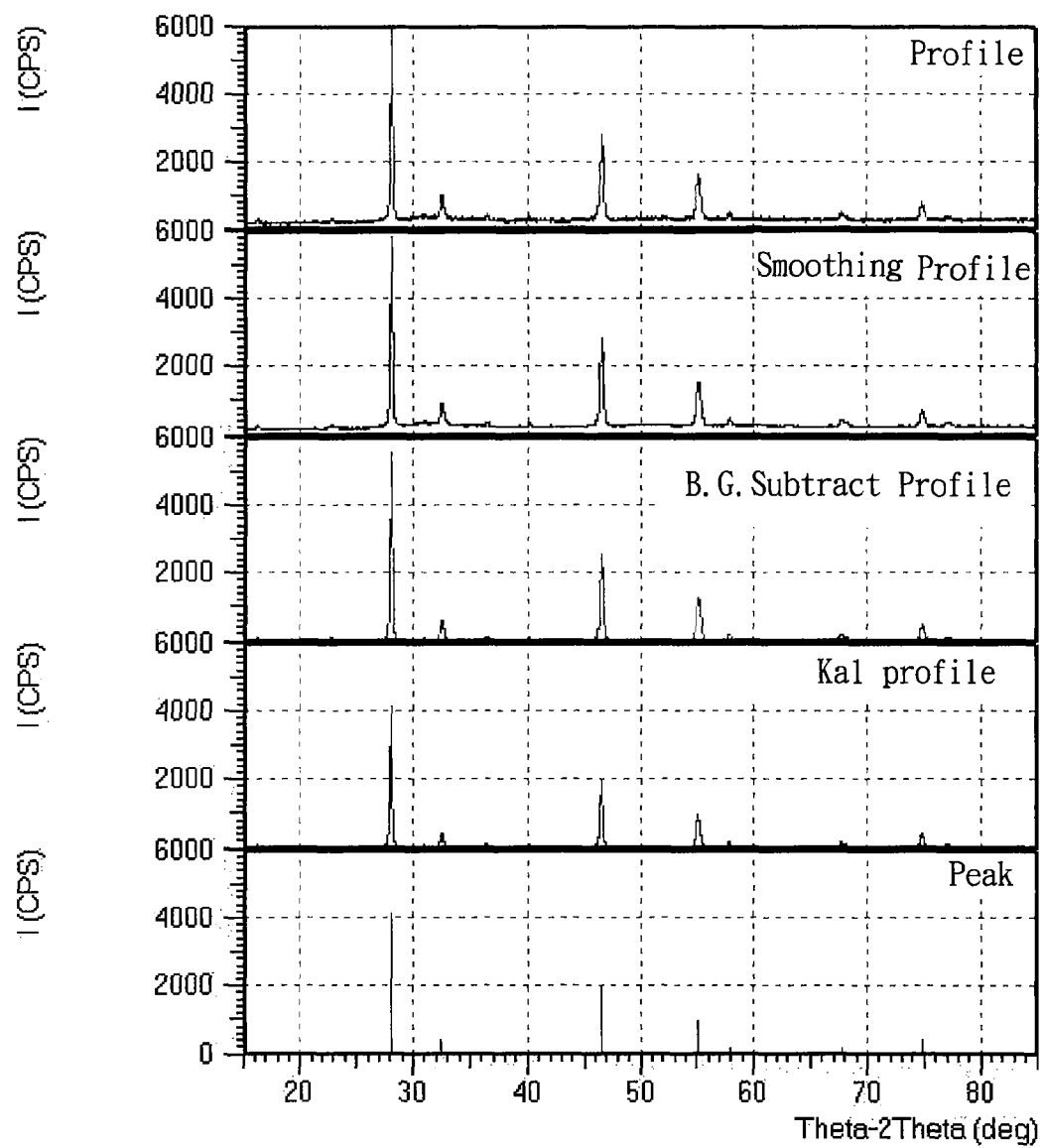
FIG. 11 shows an X-ray diffraction pattern of the product (o) of Example 11 made by the method of the preferred embodiment.

120 ml of ethylenediamine was added into a reactor. 13 g of product (n) and 0.9 g of Se powder were added into the reactor with stirring. The mixture in the reactor was stirred for 5 minutes before heating and was subsequently heated to its boiling point with stirring for 40 hrs for conducting a post treatment of the product (n) of the mixture under reflux condition. The mixture was filtered to obtain a crude cake of CuInGaSeS after the post treatment was completed and the mixture was cooled. The crude cake was washed with a solution containing a large amount of water, 2 L of ethanol and 2 L of acetone, followed by drying at a temperature of 150° C. A black powder (product (o)) of CuInGaSeS having a composition of 24.9 at % Cu, 20.1 at % In, 6.7 at % Ga, 18.5 at % Se, and 29.8 at % S was obtained. Elemental analysis shows that the black powder contains an impurity of 0.522 wt % of carbon. FIG. 11 shows the X-ray diffraction (XRD) pattern of the black powder (product (o)).

Example 12 (E12)

Removal of Impurity from Product (o)

Figure 12:
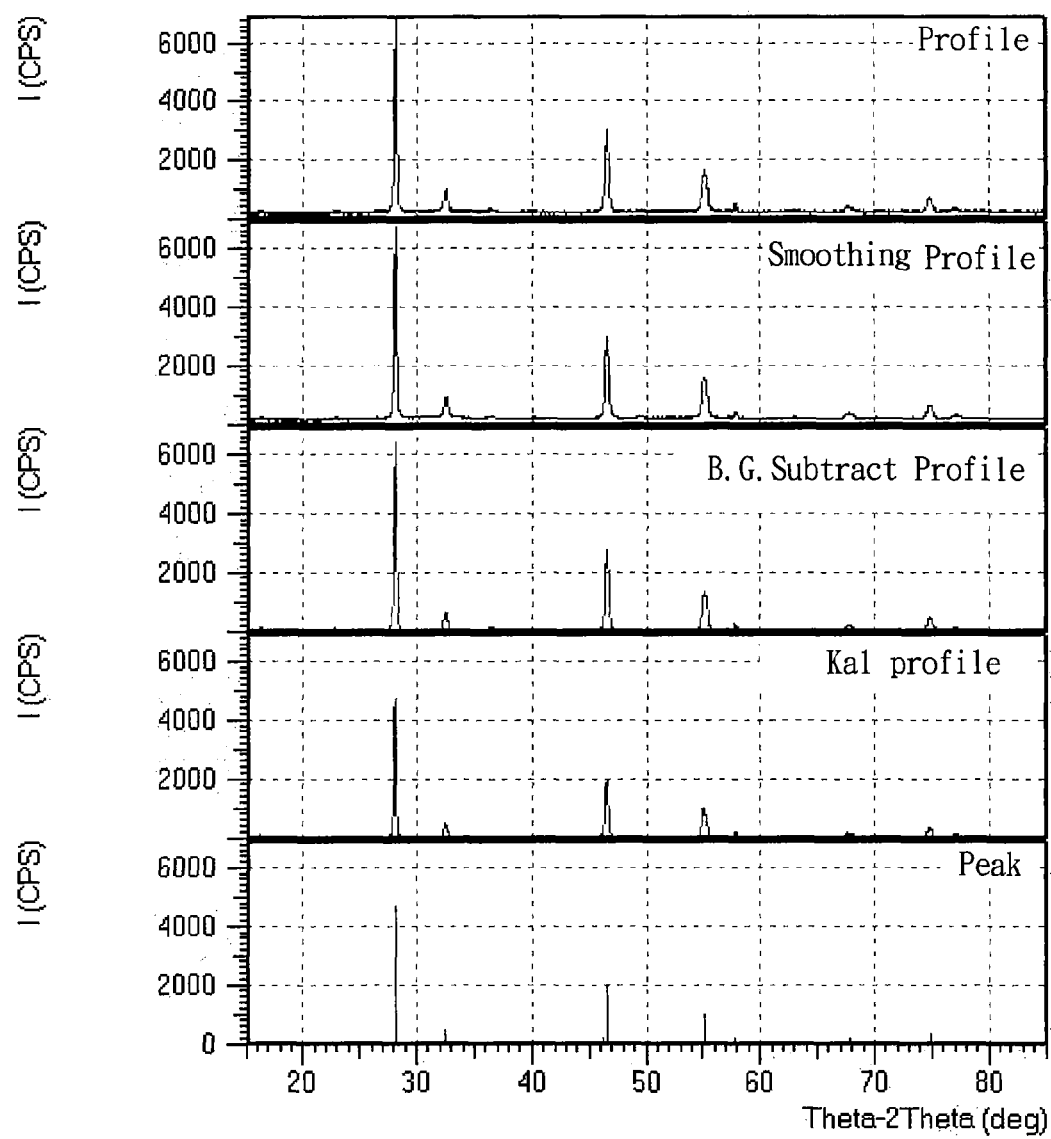
FIG. 12 shows an X-ray diffraction pattern of the product (p) of Example 12 made by the method of the preferred embodiment.

100 ml of 5% nitric acid solution was added into a reactor. 12 g of product (o) was added into the reactor with stirring. The mixture was subsequently heated to 45° C. with stirring for 4 hrs. The mixture was filtered to obtain a crude cake of CuInGaSeS after the treatment was completed and the mixture was cooled. The crude cake was washed with a solution containing a large amount of water, 2 L of ethanol and 2 L of acetone, followed by drying at a temperature of 150° C. A black powder (product (p)) of CuInGaSeS having a composition of 24.83 at % Cu, 19.82 at % In, 6.75 at % Ga, 17.41 at % Se, and 31.19 at % S was obtained. Elemental analysis shows that the black powder contains an impurity of 0.331 wt % of carbon. FIG. 12 shows the X-ray diffraction (XRD) pattern of the black powder (product (p)).

Comparative Example 1 (CE1)

Preparation of Ternary Compound $CuInSe_2$ ($M^1M^2A$)

Figure 13:
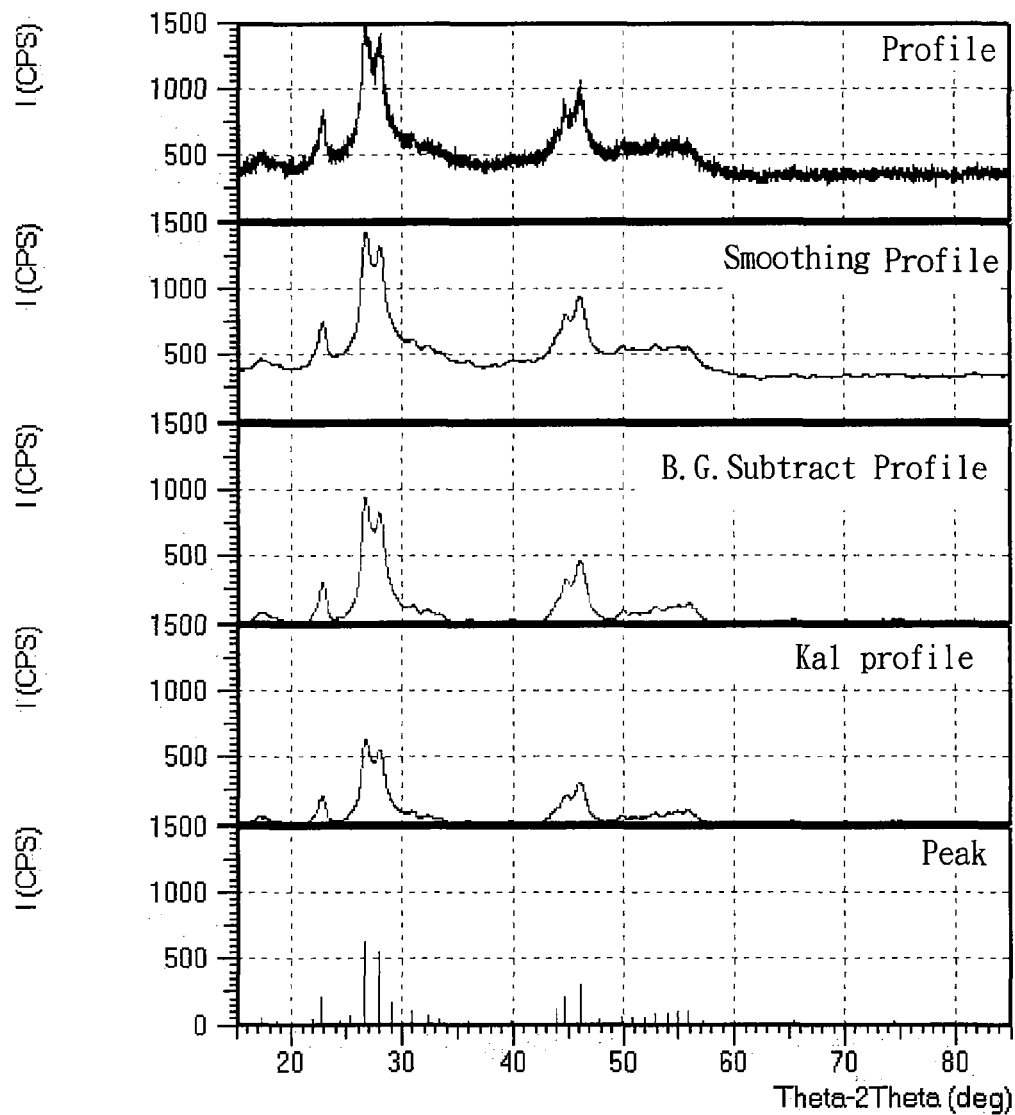
FIG. 13 shows an X-ray diffraction pattern of the product (CE1) of Comparative Example 1 made by a conventional method.

600 ml of ethylenediamine was added into a reactor. 18.75 g of Se powder was added into the reactor with stirring. The mixture in the reactor was stirred for 5 minutes. 76.24 g of $InCl_3.4H_2O$ was added into the reactor with stirring. The mixture was stirred for 20 minutes. 22.64 g of CuCl was added into the reactor with stirring. The mixture was stirred for 20 minutes before heating and was subsequently heated to a boiling point thereof with stirring for reaction of the mixture to take place. The reaction of the mixture lasted under reflux condition for 50 hrs. The mixture was filtered to obtain a crude cake of $CuInSe_2$ after the reaction was completed and the mixture was cooled. The crude cake was washed with a solution containing a large amount of water, 4 L of ethanol and 4 L of acetone, followed by drying at a temperature of 150° C. A black powder (product (CE1)) of $CuInSe_2$ having a composition of 22.49 at % Cu, 28.99 at % In and 48.51 at % Se was obtained. Elemental analysis shows that the black powder contains an impurity of 9.216 wt % of carbon. FIG. 13 shows the X-ray diffraction (XRD) pattern of the black powder (product (CE1)).

Comparative Example 2 (CE2)

Preparation of Ternary Compound $CuInSe_2$ ($M^1M^2A$)

Figure 14:
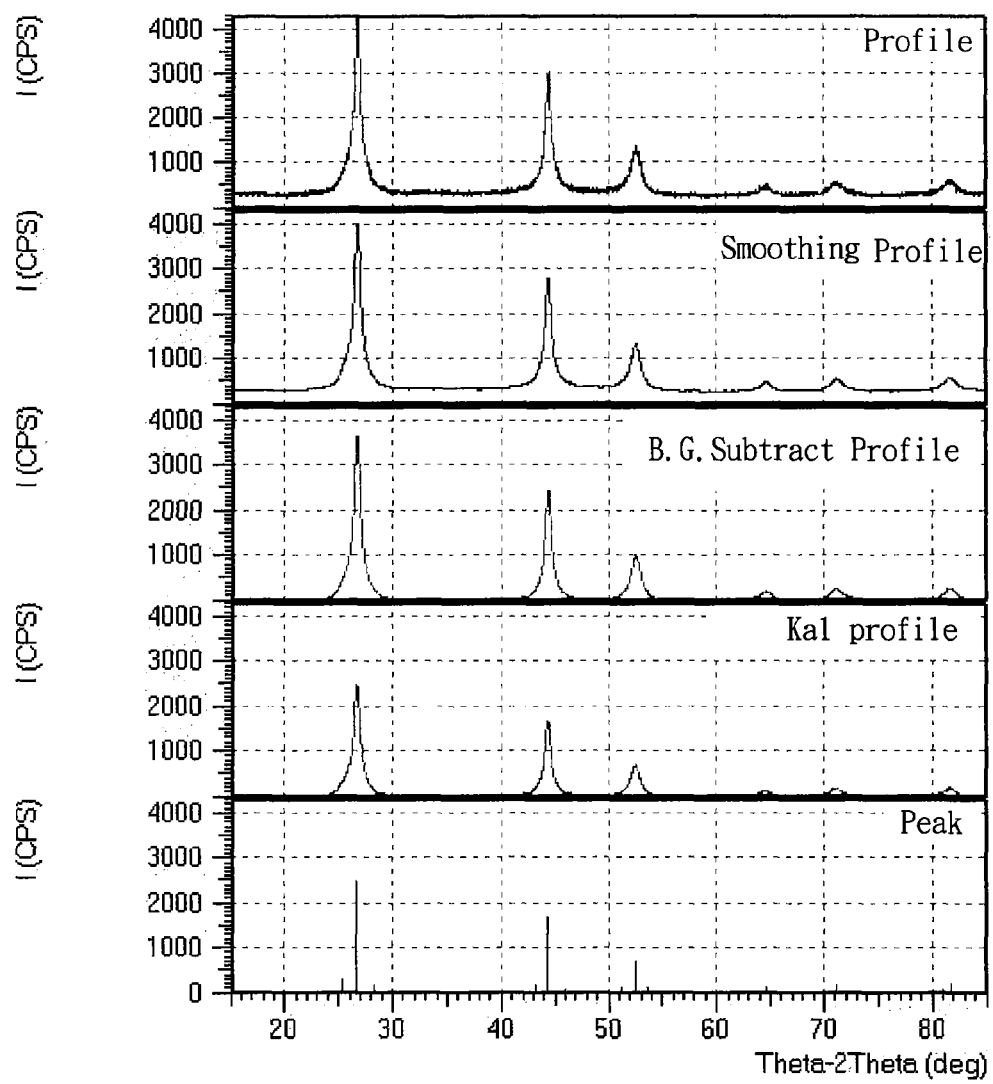
FIG. 14 shows an X-ray diffraction pattern of the product (CE2) of Comparative Example 2 made by another conventional method disclosed in U.S. Pat. No. 7,591,990.

The compound of CE2 was prepared based on the method disclosed in U.S. Pat. No. 7,591,990. 170 ml of N-methylimidazole was added into a reactor. 16.6 g of $InCl_3$ was added into the reactor with stirring. 18.7 g of $Na_2Se$ powder was slowly added into the reactor with stirring to form a first mixture. 90 ml of N-methylimidazole was added into a second reactor. 7.4 g of CuCl was added into the second reactor with stirring to form a second mixture. The first mixture was cooled to about 3° C., followed by slowly adding the second mixture into the first mixture with stirring while the temperature remained below 5° C. for reaction to take place. The reaction lasted for about 12 hrs. The reaction mixture was filtered to obtain a crude cake of $CuInSe_2$ after the reaction was completed and the mixture was cooled. The crude cake was washed with a solution containing a large amount of water, 4 L of ethanol and 4 L of acetone, followed by drying at a temperature of 150° C. A black powder (product (CE2)) of $CuInSe_2$ having a composition of 26.02 at % Cu, 26.34 at % In and 47.64 at % Se was obtained. Elemental analysis shows that the black powder contains an impurity of 4.322 wt % of carbon. FIG. 14 shows the X-ray diffraction (XRD) pattern of the black powder (product (CE2)).

Comparative Example 3 (CE3)

Preparation of Quaternary Compound $CuInGaSe_2$ ($M^1M^2M^3A$)

Figure 15:
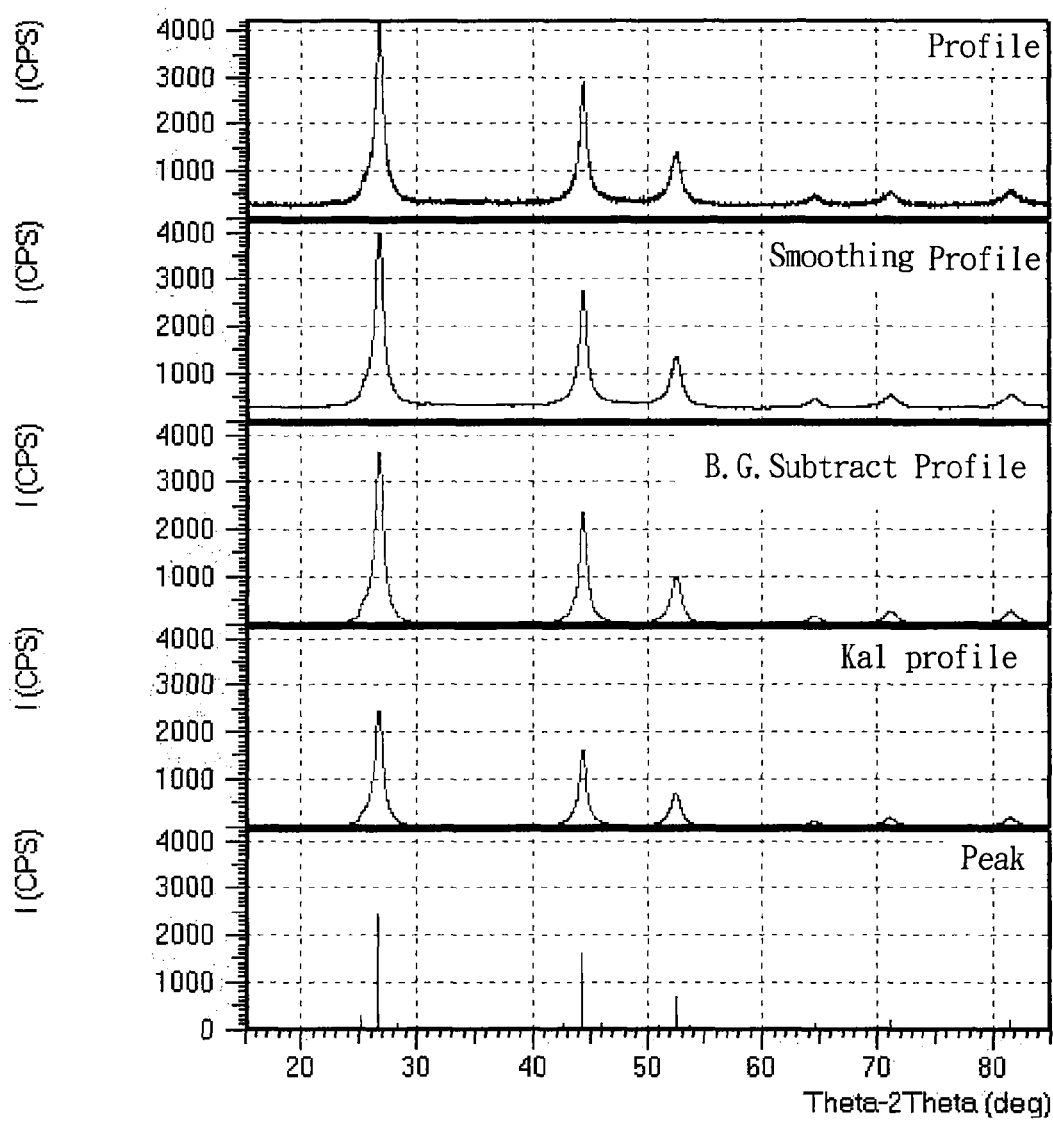
FIG. 15 shows an X-ray diffraction pattern of the product (CE3) of Comparative Example 3 made by the conventional method disclosed in U.S. Pat. No. 7,591,990.

The compound of CE3 was prepared based on the method disclosed in U.S. Pat. No. 7,591,990. 170 ml of N-methylimidazole was added into a reactor. 14.6 g of $InCl_3$ and 1.58 g of $GaCl_3$ were added into the reactor with stirring. 18.7 g of $Na_2Se$ powder was slowly added into the reactor with stirring to form a first mixture. 90 ml of N-methylimidazole was added into a second reactor. 7.4 g of CuCl was added into the second reactor with stirring to form a second mixture. The first mixture was cooled to about 3° C., followed by slowly adding the second mixture into the first mixture under stirring while the temperature remained below 5° C. for reaction to take place. The reaction lasted for about 12 hrs. The reaction mixture was filtered to obtain a crude cake of $CuInGaSe_2$ after the reaction was completed and the mixture was cooled. The crude cake was washed with a solution containing a large amount of water, 4 L of ethanol and 4 L of acetone, followed by drying at a temperature of 150° C. A black powder (product (CE3)) of $CuInGaSe_2$ having a composition of 19.4 at % Cu, 21.72 at % In, 7.28 at % Ga, and 51.6 at % Se was obtained. Elemental analysis shows that the black powder contains an impurity of 4.339 wt % of carbon. FIG. 15 shows the X-ray diffraction (XRD) pattern of the black powder (product (CE3)).

Comparative Example 4 (CE4)

Preparation of Five-Element Compound CuInGaSeS ($M^1M^2M^3A^1A^2$)

Figure 16:
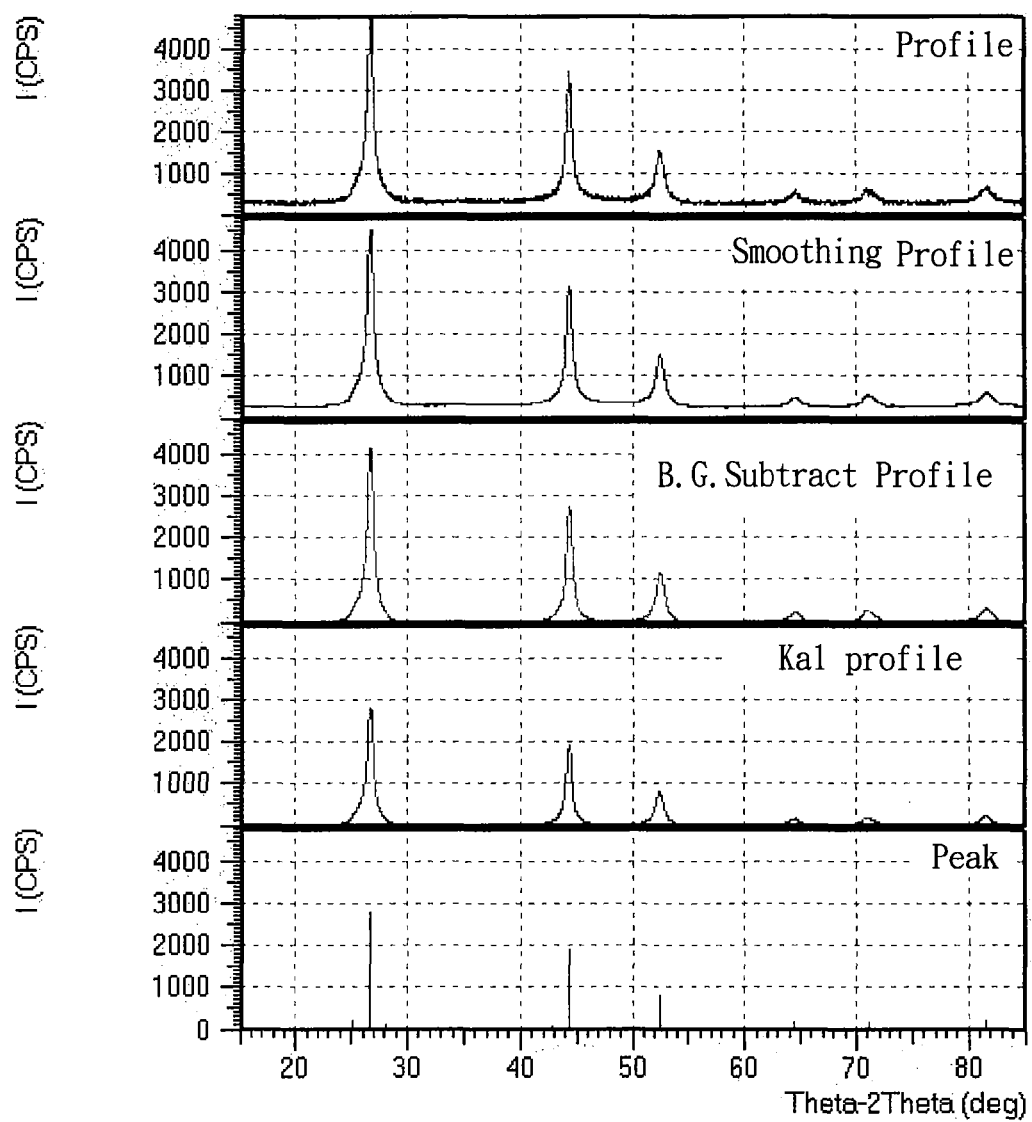
FIG. 16 shows an X-ray diffraction pattern of the product (CE4) of Comparative Example 4 made by the conventional method disclosed in U.S. Pat. No. 7,591,990.

The compound of CE4 was prepared based on the method disclosed in U.S. Pat. No. 7,591,990. 170 ml of N-methylimidazole was added into a reactor. 14.6 g of $InCl_3$ and 1.58 g of $GaCl_3$ were added into the reactor with stirring. 9.37 g of $Na_2Se$ powder and 5.85 g of $Na_2S$ were slowly added into the reactor with stirring to form a first mixture. 90 ml of N-methylimidazole was added into a second reactor. 7.4 g of CuCl was added into the second reactor with stirring to form a second mixture. The first mixture was cooled to about 3° C., followed by slowly adding the second mixture into the first mixture with stirring while the temperature remained below 5° C. for reaction to take place. The reaction lasted for about 12 hrs. The reaction mixture was filtered to obtain a crude cake of CuInGaSeS after the reaction was completed and the mixture was cooled. The crude cake was washed with a solution containing a large amount of water, 4 L of ethanol and 4 L of acetone, followed by drying at a temperature of 150° C. A black powder (product (CE4)) of CuInGaSeS having a composition of 24.64 at % Cu, 22.1 at % In, 6.98 at % Ga, 25.88 at % Se, and 20.4 at % S was obtained. Elemental analysis shows that the black powder contains an impurity of 2.936 wt % of carbon. FIG. 16 shows the X-ray diffraction (XRD) pattern of the black powder (product (CE4)).

TABLE 1

|  | product | Type of compound | Carbon content, wt % |
|---|---|---|---|
| Example 1 | (c) | ternary | 1.536 |
| Comparative Example 1 | (CE1) | ternary | 9.216 |

TABLE 1-continued

|  | product | Type of compound | Carbon content, wt % |
| --- | --- | --- | --- |
| Comparative Example 2 | (CE2) | ternary | 4.322 |
| Example 7 | (k) | quaternary | 1.332 |
| Comparative Example 3 | (CE3) | quaternary | 4.339 |
| Example 10 | (n) | five-element | 0.928 |
| Comparative Example 4 | (CE4) | five-element | 2.936 |

Table 1 shows comparisons in the carbon content among Example 1 and Comparative Examples 1 and 2 for the ternary chalcopyrite-type compound, between Example 7 and Comparative Example 3 for the quaternary chalcopyrite-type compound, and between Example 10 and Comparative Example 4 for the five-element chalcopyrite-type compound, respectively. The results show that a considerable reduction in the carbon content of the chalcopyrite-type compound can be achieved for the method of this invention as compared to the conventional methods.

With the invention thus explained, it is apparent that various modifications and variations can be made without departing from the spirit of the present invention. It is therefore intended that the invention be limited only as recited in the appended claims.

What is claimed is:

1. A method for making a chalcopyrite-type compound, comprising:
    reacting a reaction mixture in a solvent under reflux condition to form the chalcopyrite-type compound;
    wherein the reaction mixture includes at least one first compound and at least one second compound, the first compound containing $M^1$ and A, the second compound containing $M^2$ and A, in which $M^1$ is selected from Cu, Au, Ag, Na, Li and K, $M^2$ is selected from In, Ga, Al, Ti, Zn, Cd, Sn, Mg, and combinations thereof, and A is selected from S, Se, Te, and combinations thereof.

2. The method of claim 1, further comprising preparing the second compound by reacting a chemical substance containing $M^2$ with a powder of a material selected from S, Se, Te, and combinations thereof in a solvent solution under reflux condition.

3. The method of claim 2, wherein the solvent solution is a mixture of water and a solvent.

4. The method of claim 3, wherein the solvent is selected from alkylamine, dimethyl foramide, N-methylpyrolidone, dimethyl sulfoxide, oleyamine, glycerol, and ethyleneglycol.

5. The method of claim 4, wherein the solvent is ethylenediamine.

6. The method of claim 2, further comprising filtering the reaction mixture of the reaction of the chemical substance containing $M^2$ and the powder of the material after the reaction is completed so as to obtain a crude cake, and washing the crude cake.

7. The method of claim 6, wherein washing of the crude cake is carried out using a washing solution containing water, alcohol and ketone.

8. The method of claim 6, wherein washing of the crude cake is carried out using an acid.

9. The method of claim 1, further comprising filtering the reaction mixture after the reaction so as to obtain a crude cake, followed by washing the crude cake with an acid.

10. The method of claim 1, further comprising preparing the first compound by reacting a chemical substance containing $M^1$ with a powder of a material selected from S, Se, Te, and combinations thereof in the solvent under reflux condition.

11. The method of claim 10, further comprising filtering the reaction mixture of the reaction of the chemical substance containing $M^1$ and the powder of the material after the reaction is completed so as to obtain a crude cake, and washing the crude cake.

12. The method of claim 1, further comprising filtering the reaction mixture of the reaction of the first and second compounds after the reaction is completed so as to obtain a crude cake of the chalcopyrite-type compound, mixing the crude cake with the solvent and a powder of a post-treatment material selected from S, Se, Te, and combinations thereof to form a mixture, and heating the mixture in a manner to permit the mixture to undergo a post treatment under reflux condition for removing impurities from the crude cake.

13. The method of claim 1, wherein the reaction mixture includes one first compound of Cu—Se and one second compound of In—Se.

14. The method of claim 1, wherein the reaction mixture includes one first compound of Cu—Se and two second compounds of In—Se and Ga—Se.

15. The method of claim 1, wherein the reaction mixture includes one first compound of Cu—Se and two second compounds of In—Se and Ga—Se.

* * * * *